United States Patent [19]

Quercia

[11] 4,053,869
[45] Oct. 11, 1977

[54] BURGLAR ALARM SYSTEM

[76] Inventor: Charles Quercia, 20 rue Victor Dumay, 21000 Dijon, France

[21] Appl. No.: 685,614

[22] Filed: May 12, 1976

[30] Foreign Application Priority Data

May 14, 1975 France .................... 75.15574

[51] Int. Cl.² ............................ B60R 25/10
[52] U.S. Cl. ................ 340/64; 340/309.1; 307/10 AT
[58] Field of Search ............. 340/63, 64, 309.1; 307/10 AT

[56] References Cited

U.S. PATENT DOCUMENTS 3,740,713  6/1973  Teich .................... 340/64

Primary Examiner—Alvin H. Waring
Attorney, Agent, or Firm—Otto John Munz

[57] ABSTRACT

A protective alarm system for a vehicle or the like wherein a protective switch initiates operation of a circuit combining two timing effects : effecting time delaying of an alarm device, and determining the duration of the alarm. Once initiated by the protective switch, the alarm is actuated after a predetermined delay and for a predetermined duration despite any action on the switch such as a periodical opening and closing. Circuitry operated by a key switch defeats instantaneously actuation of the alarm system when a further manually operated knob is on, which results in a necessary order of operation, involving the possession of the key, to inhibit definitely the alarm.

4 Claims, 1 Drawing Figure

BURGLAR ALARM SYSTEM

BACKGROUND OF THE INVENTION

1. Field of the Invention

A protective alarm system for motor vehicle or the like is provided with a compact solid-state circuitry. Once actuated by a protective switch, the circuitry initiates the alarm after a predetermined delay and for a predetermined duration unless a definite succession of manual operation, involving the possession of a key, is carried out.

2. Description of the Prior Art

Burglar alarm systems are known comprising a first timing circuit which is operated by one or more protective switches and which in turn controls a second timing circuit, thereby to control the operation of an alarm circuit. Activation of the system is initiated by unauthorized tampering with a door, window or the like. A third key-operated timing circuit provides for activation of the protective circuit only after a predetermined time. See U.S. Pat. No. 3,659,266 to MEYERLE.

In such systems of the prior art, the alarm keeps operating for a predetermined time despite reclosing of the entrance. But if the reclosing occurs before the alarm is initiated (that is before the end of the first timing-circuit delay), the system resets itself in the initial conditions. Then, if a burglar or his accomplice opens and shuts the door with a period less than the time delay of the first timing circuit, the alarm is not triggered, and the burglar is able to operate at ease, as long as necessary for his evil-minded action.

Another drawback of a prior art burglar alarm system of that type is the considerable number of the components therein which are required by the structural or physical separation of the first and second timing circuits.

SUMMARY OF THE INVENTION

An object of the present invention is a new circuit combining said first and second timing circuits, which results in an important reduction of the number of the components, thus reducing the cost and increasing viability of the system.

The applicant has visualised for this purpose and has utilised a combined circuit which satisfies the two time-delay functions. It comprises a first capacitor shunted by a first resistance to introduce a time constant into the discharge, a second capacitor having one time constant with respect to the charge introduced by a second resistance and a second time constant with respect to the discharge introduced by the first resistance, and a diode shunting the second resistance. The first resistance and the second resistance are preferably adjustable.

Another object of the invention is to provide a key-operated timing circuit which is directly dependent on a key, for example the ignition key of the vehicle engine, and which is capable of being set by means of a two-position knob, so that a warning is triggered at the completion of the warning delay period when the delay-action triggering unit is set, whatever may be the position of the knob.

This circuit causes activation or deactivation of the protective system. It is included in the supply circuit of this protective system. It comprises an electronic gate which is formed of two transistors, a capacitor, the charge or discharge state of which controls the opening or closing of the electronic gate and means for charging two-position knob and a switch. The switch is preferably controlled by the ignition key of the vehicle.

For the purpose of charging the capacitor, it is necessary for the two-position knob to be closed for a period of time corresponding to the duration of the charging, and for the switch to be open (ignition key withdrawn); the delay-action control member is then set.

Once it is charged, the capacitor holds its charge for a considerable time, even if the switch is opened. Consequently, if a burglar gets into the vehicle and if he does not have the key for making contact before the warning-delay period expires, the alarm will be triggered on and will only be shut off at the end of the delay-action period, even if the burglar operates the two-position knob, which it will therefore not be necessary to conceal. The warning will not be stopped if the burglar cancels the means which has triggered the warning by reclosing the door for example.

In order to discharge the capacitor and thus to make the delay-action trigger device inoperative, it is necessary for the switch and the two-position knob to be both instantaneously closed.

The advantage of the two-position knob or button is that it permits the owner of the vehicle to cancel out, when necessary, the triggering of the warning signal without having to leave the ignition key in position.

BRIEF DESCRIPTION OF THE DRAWING

The sole FIGURE is a schematic diagram illustrating an exemplary embodiment of the invention.

DESCRIPTION OF THE PREFERRED EMBODIMENT

Figure 1:
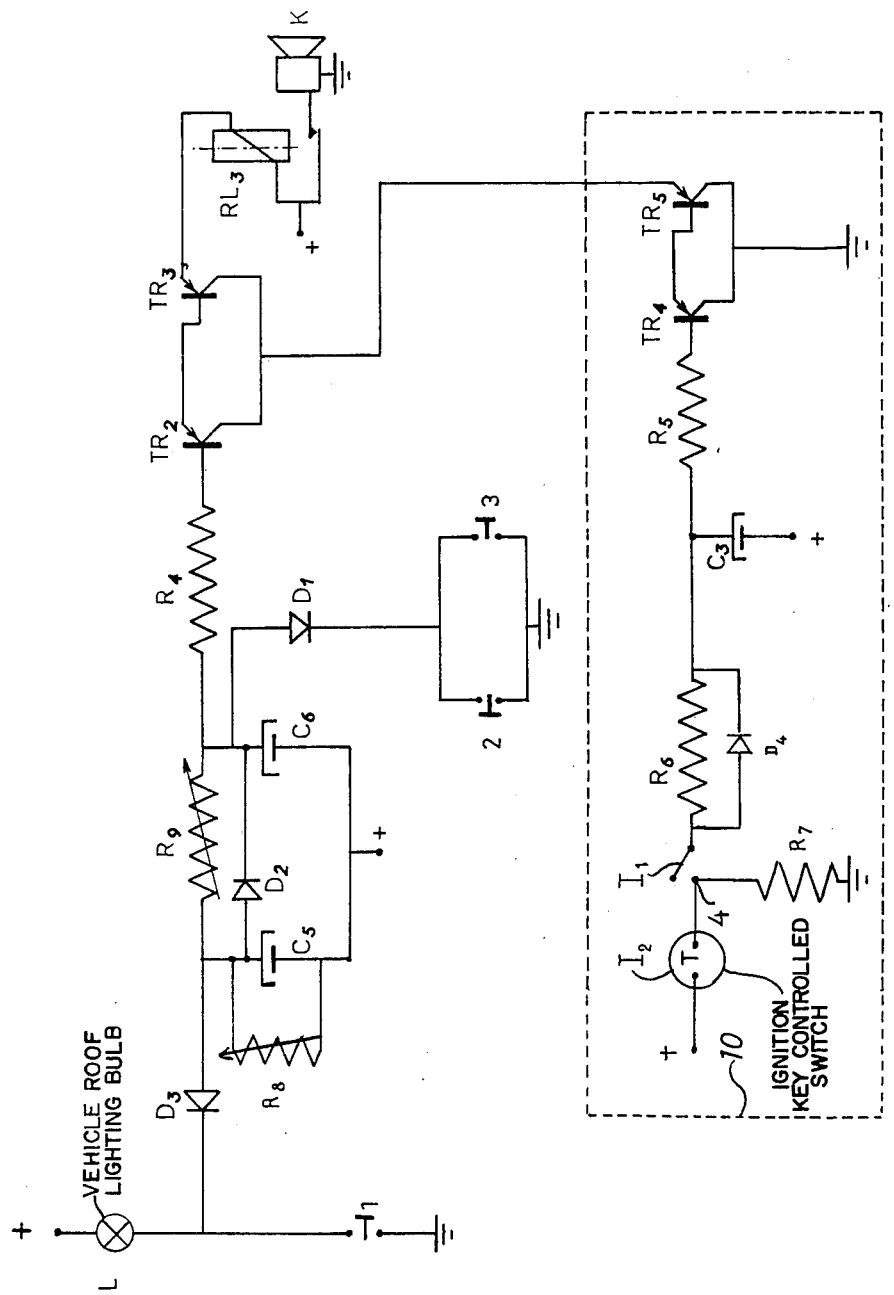

On this diagram, a double timing function is performed by the combination of two capacitors $C_5$ and $C_6$, two adjustable resistors $R_8$ and $R_9$ and one diode $D_2$ shunting $R_9$. $R_8$ is connected in parallel with $C_5$. A common terminal of $C_5$, $R_8$, $D_2$ and $R_9$ is connected to the plus terminal of a power supply, for instance the battery of the vehicle, through a diode $D_3$ and through the lighting bulb L of the vehicle. The conventional door contact switch 1 of this light is open when the door is closed. A common terminal of $C_6$, $D_2$ and $R_9$ is connected through a resistor $R_4$ to a pair of transistors $TR_2$ and $TR_3$ forming a Darlington circuit which controls a relay $RL_3$ actuating an alarm K. The same common terminal is also connected to other protective switches 2 and 3 (rear door, trunk etc. . . .) through a diode $D_1$.

The plus terminals of condensers $C_5$ and $C_6$ are connected to the plus terminal of the battery. When contacts 1, 2 and 3 are open, $C_5$ and $C_6$ are normally discharged.

Disregarding the for the moment block 10 which controls the power supply of the Darlington circuit containing $TR_2$ and $TR_3$, it will be assumed that the power is supplied.

The aforementioned double timing function is obtained:

For the initiation of the alarm, by the charging time of the capacitor $C_6$ via the resistance $R_9$.

For the alarm period, by the discharge time through the resistance $R_8$ of the capacitor $C_6$ and of the capacitor $C_5$ mounted in parallel. $D_2$ passes or transmits current in this direction.

The parallel charging circuit of the two capacitors $C_5$ and $C_6$ comprises diode $D_3$ and the roof light contact 1. The closing of 1 produces the quasi-instantaneous charging of $C_5$, whereas tht of $C_6$ is progressive and is a function of its capacitance and of the value of the resistance $R_9$ (for the charging of $C_6$, the diode $D_2$ has its poles in a direction which does not allow it to pass current.

When the door which controls the closure of the contact 1 is opened, $C_5$ is immediately charged and $C_6$ is progressively charged. Even if switch 1 is once again opened, the charging of $C_6$ then continues, with charge passing from $C_5$ by way of $R_9$. When $C_6$ is charged, it opens $TR_2$, which opens $TR_3$ and, thus causing $RL_3$ to be energised, for the entire period when switch 1 is closed. If now switch 1 is opened (by closing the door), $C_5$ and $C_6$, which are arranged in parallel with the discharge through the diode $D_2$, are discharged into $R_8$ during the warning period, which therefore depends on the sum of the capacitances of $C_5$ and $C_6$ and on the value of the resistance $R_8$.

If which one of the contacts 2 or 3 which is closed, $C_6$ and $C_5$ are immediately charged, the diodes $D_1$ and $D_2$ being transmissive or open in this direction. The diode $D_3$ prevents discharge into the roof light L. If $I_2$ is open and $C_3$ is charged (by a mechanism to be discussed later), the warning is initiated. If the contact 2 or 3 is opened, the duration of the warning is fixed, as previously, by the discharge of $C_5$ and $C_6$ into $R_8$.

This obviously assumes that the trigger device of block 10 is set and is feeding power to $TR_2$ and $TR_3$. The trigger device comprises two transistors $TR_4$ and $TR_5$ forming a Darlington circuit, a capacitor $C_3$ for fixing the voltage of the base of the transistor $TR_4$ by means of a resistance $R_5$ and which is capable of being charged by means of two series-resistances $R_6$ and $R_7$, by closing a two-position button or knob switch $I_1$. $R_6$ is shunted by a diode $D_4$, which is blocked to the charge of the capacitor $C_3$. $I_1$ is between $R_6$ and $R_7$. When $I_1$ is closed, the junction point 4 of $R_6$ and $R_7$ can be brought to a positive potential by closing a switch $I_2$.

The collectors of $TR_4$ and $TR_5$, which are in parallel, derive their negative feed from the capacitor $C_6$.

$I_2$ is a key-operated switch which is controlled by the ignition key T of the vehicle, and if this key is inserted and turned, $I_2$ is closed.

As a modification, the resistance $R_7$ can be omitted and the point 4 can be directly connected to the make-and-break terminal of the engine, which is positive when the ignition key is turned. The equivalent arrangement of FIG. 1, in which $R_7$ may be any arbitrary accessory, for example, a bulb, nevertheless enables the operation of the delay-action trigger device to be better understood, this operation being as follows:

It is first of all to be assumed that $C_3$ is discharged, this being obtained by closing $I_1$ and $I_2$ ($D_4$ is passing current with the discharge), and then by $I_1$ and $I_2$ being opened successively and in order.

If $C_3$ is discharged, the base of $TR_4$ is positive, and therefore $TR_4$ is non-passing and blocks $TR_5$. There is no supply to $TR_2$ and $TR_3$, $RL_3$ is at rest, even if the doors are opened, and even if the ignition key is removed. The vehicle is not protected. It is possible freely to open the doors, the trunk, and to change a wheel. In the circumstances as visualized, this could be called a position in which the thief may do as he pleases.

Before leaving the vehicle for taking a walk, the occupants will have to be careful to close trunk and all the doors, except one, and naturally to remove the ignition key, and then to close $I_1$; $C_3$ starts to be charged by way of $R_6$ and $R_7$, and it is then necessary quickly to close the last door. The vehicle is protected.

If a burglar gains access to the vehicle by breaking in, the warning signal will be triggered at the end of the delay period of $C_6$; if he again closes the door, this as previously, is without any effect, and in addition, if he operates $I_1$ (which is not concealed), this also has no effect.

Having returned to the vehicle, the owner will open the driver's door, ignition key in hand, and will take advantage of the delay action of the commencement of the warning for closing $I_2$, $C_3$ being quickly discharged through $D_4$. The owner then opens $I_1$. The vehicle is no longer protected.

If he returns to his vehicle simply for the purpose of picking up an object, he will leave $I_2$ closed for the necessary time. After this, he will close all the doors, except one, he will open $I_2$ and will arrange as previously for the delay action of the triggering of the warning for the closing of the last door. The vehicle is once again protected.

I claim:

1. An alarm system for use in a vehicle to detect unauthorized entry into the vehicle, comprising:

A. a first switch means positioned to be operated when a door of the vehicle is opened, B. a key-operated switch means having at least first and second switch conditions, normally being in the first condition when the vehicle is empty, and adapted to be placed in the second condition by insertion and operation of a key, C. a two-position switch means which is manually operable between first and second switch positions, D. alarm means for giving an alarm when operated, E. disabling means operative only when the key-operated switch is in the second condition and responsive to placement of the two-position switch in the second switch position for disabling the alarm system, F. first delay means, operative only when the two-position switch is in the first switch position, and responsive to the act of placing the key-operated switch in the first condition, for beginning to measure a first delay interval, G. second delay means, fully operative only after the first delay interval has been measured to its conclusion, and responsive to operation of the first switch means, for beginning to measure a second delay interval, and H. third delay means, operative unless and until inhibited by placement of the key-operated switch means in the second condition, for defining a third delay interval during which the alarm means is operated.

2. For use in a vehicle having a d.c. power supply, an alarm system for providing an alarm in response to unauthorized entry into the vehicle, said system comprising:

A. switch means operated by said entry,

B. alarm means,

C. alarm energizing means connected to operate said alarm means, the energizing means being provided with an input terminal and, when activated by an activating signal to said input terminal, energizing said alarm means to produce said alarm, and D. activating means connected to said switch means for activating said alarm energizing means after a predetermined delay and during a predetermined duration in response to the operation of said switch means, wherein said activating means comprises 1. an input capacitor connected across the terminals of said power supply through a circuit including said switch means,
2. a first resistor shunting said input capacitor,
3. an output capacitor coupled to said input capacitor through a second resistor shunted by a diode, and
4. means for connecting said input terminal to the common terminal of said output capacitor and said second resistor.

3. An alarm system according to claim 2, wherein at least one of the first and second resistors is adjustable.

4. An alarm system according to claim 3, wherein said alarm energizing means further comprises an exit delay means controlled by a key switch and by a manual switch, said exit delay means including an RC network comprising a third capacitor connected to said power supply, a third resistor shunted by a diode in series with said capacitor, and a fourth resistor connected to ground, said manual knob being inserted between said third and fourth resistor, said key switch having a first terminal connected to the common terminal of said manual knob and of said fourth resistor, and having a second terminal connected to said power supply, said exit delay means further including means to inhibit said alarm energizing means when said third capacitor is discharged.

* * * * *